Figure 1:
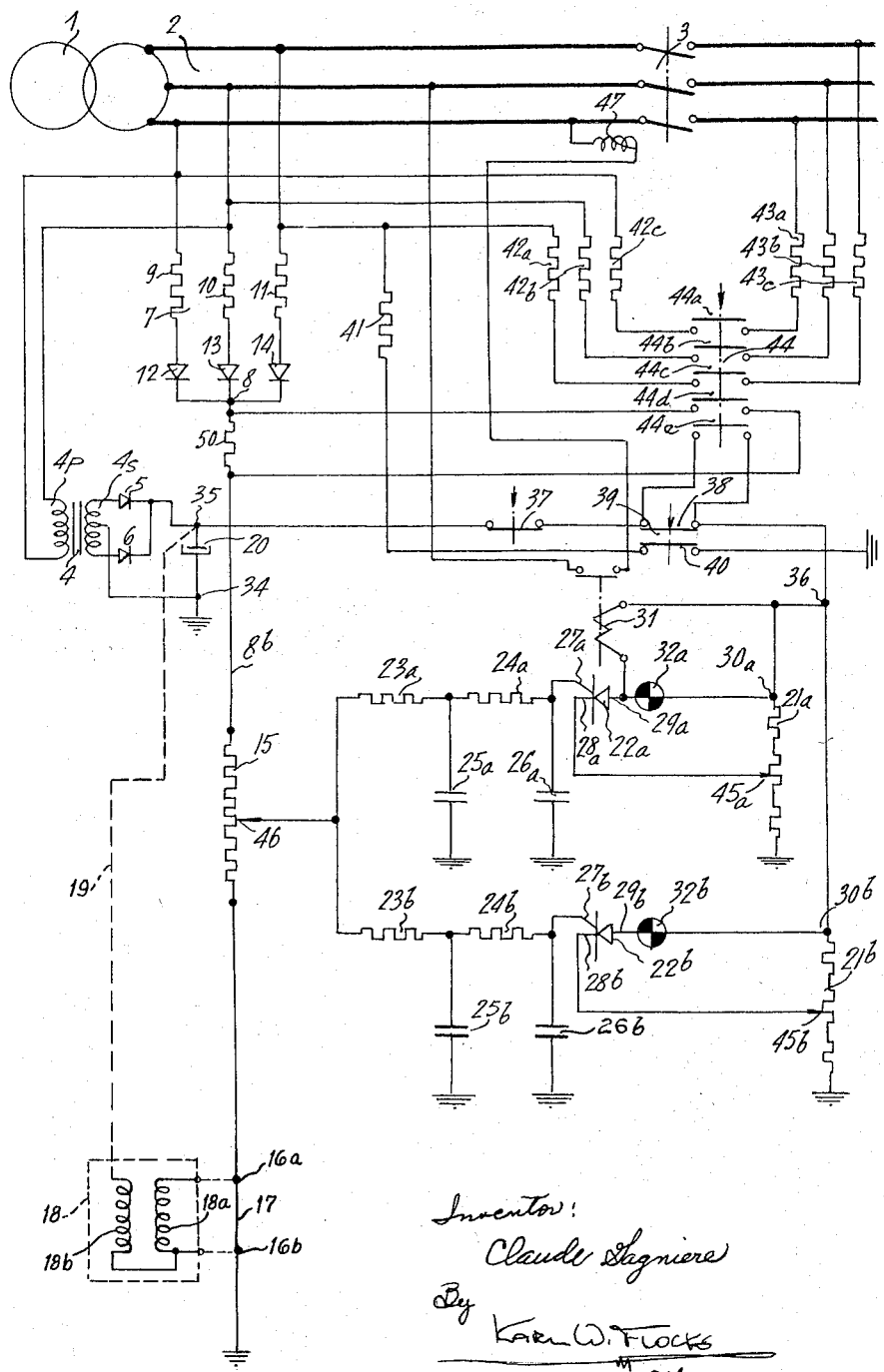

Nov. 15, 1966     C. GAGNIERE     3,286,129
FAULT DETECTION NETWORK

Filed Oct. 8, 1963     4 Sheets-Sheet 3

Inventor
Claude Gagniere
By
Karl W. Flocks
Attorney

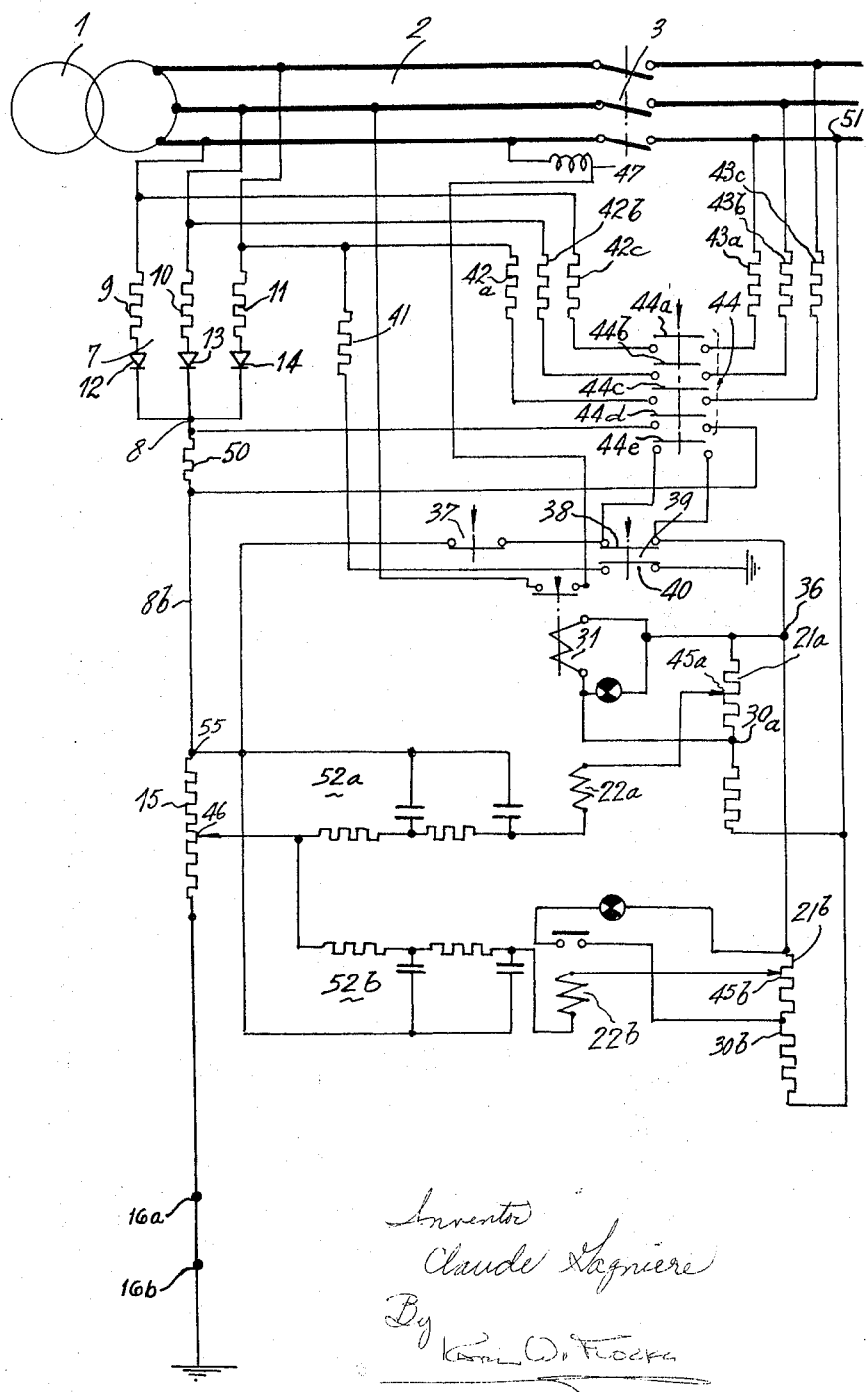

United States Patent Office 3,286,129
Patented Nov. 15, 1966

3,286,129
FAULT DETECTION NETWORK
Claude Gagniere, Nogent sur Oise, France, assignor to Charbonnages de France, Paris, France
Filed Oct. 8, 1963, Ser. No. 314,748
Claims priority, application France, Oct. 13, 1962, 912,199
6 Claims. (Cl. 317—18)

It is known to provide devices for protecting A.C. electric networks against ground faults, wherein, in the event of a fault between one or more phases and ground, a biased current is caused to appear in an electric connection between the network phases and ground, said biased current being sensed to measure the insulation of the network with respect to ground and, if desired, to operate an alarm or a network-cutoff device when the insulation is insufficient.

Such systems have a big drawback in that the insulation indications and the triggering and alarm thresholds are a function of the intensity of the current flowing through the connection between the common point and ground. Since, for a given value of fault, this current is proportional to the network voltage, it will be appreciated that a variation of the voltage results in a variation of the insulation-value indication and of the triggering or alarm threshold. In some cases the variation is of sufficient magnitude to prevent the device from intervening even in the case of a plain fault between a phase and ground. For example, if the internal resistance of the insulation monitor is of 15,000 ohms, and if the insulation fault on a phase which should cause triggering is of 2,000 ohms with a voltage of 500 volts, the continuous component of the corresponding current intensity in the detection connection is experimentally of 25 ma. If the fault is plain, it is of 30 ma. Should the voltage drop to 400 v., the intensity in the case of a 2,000-ohm fault is of 20 ma., and in the case of a plain fault is of 24 ma. only. It will be seen that in this latter case the device provides no protection whatsoever, even with a plain fault.

In another known system, the connection between network and ground is made through inductors, the current flowing through said connection, in the event of a fault, being rectified.

As with all other known systems mentioned above, the triggering threshold of the device depends upon the network voltage.

Moreover, in the event of a balanced fault in the three phases of a triphase network, the potential of the neutral point of the network-ground connection is nil with respect to ground, giving rise to the serious drawback that no current can flow in the case of a plain short-circuit, and consequently that the triggering device does not operate.

Finally, in this system, no separate adjustments can be made for the alarm threshold and the triggering threshold.

The object of the present invention is to provide a method and devices using said method which completely overcome the drawbacks inherent to the aforesaid known systems, said method and devices being designed for obtaining a triggering or warning signal in the case of an insulation fault at predetermined values of insulation, independent of variations in the network voltage, said devices being, moreover, insensistive to the capacitance of the network.

The method according to the invention comprises opposing two D.C. voltages having the same polarity with respect to a common point, of which one is a linear function of the voltage of the network whose insulation is to be monitored, and of which the other is a linear function of the intensity of polarized current which flows in a common connection between the network phases and ground, and causing an alarm device and/or a supply current cutoff device to be triggered as soon as the second voltage is higher in absolute value than the first.

According to a further feature the two voltages are adjustable.

The device according to the invention comprises means for operating a warning device and/or a network-supply current cutoff device, said means being inserted in a connection between two points, of which one is on a resistor inserted in a polarized common connection between the network phases and ground, and of which the other is on a D.C. circuit supplied from the network.

According to another feature, the D.C. circuit supplied from the network is supplied through a transformer and rectifiers.

According to a further feature, the means for operating the warning and/or cutoff device is a galvanometric relay.

According to an embodiment, the means for operating the warning and/or cutoff device is polarized relay.

According to a further embodiment, the means for operating the warning and/or cutoff device is a silicon controlled rectifier, of which one electrode and the control electrode are connected to the aforemenioned two points.

According to one embodiment, the device comprises a plurality of branch circuits from the D.C. circuit and a plurality of warning means and/or controls, each inserted in a connection between a point positioned on the resistor inserted in the common polarized connection between the network phases and ground, and a point located on one of the branch lines of the D.C. circuit.

Figure 2:
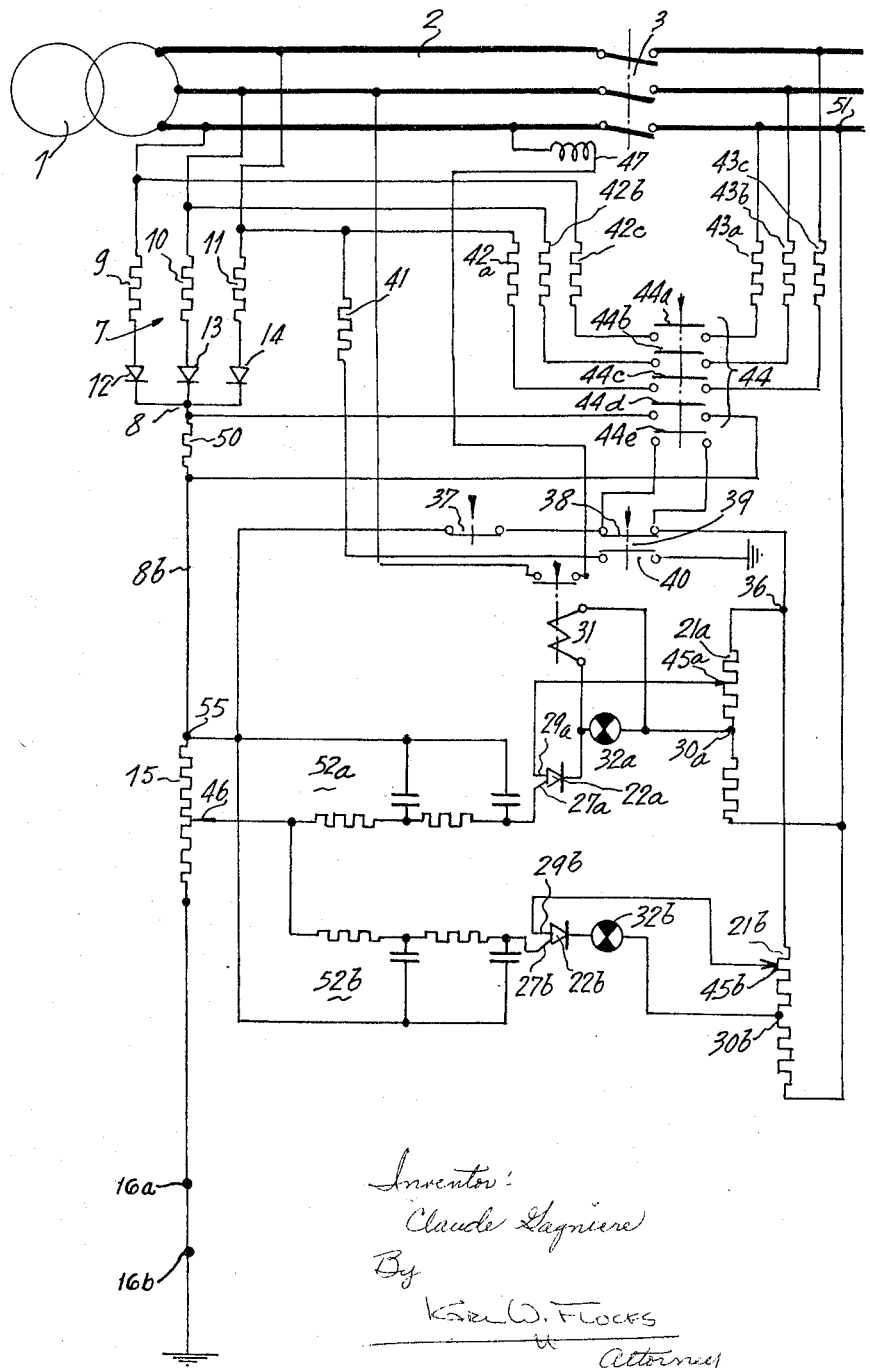
Figure 3:
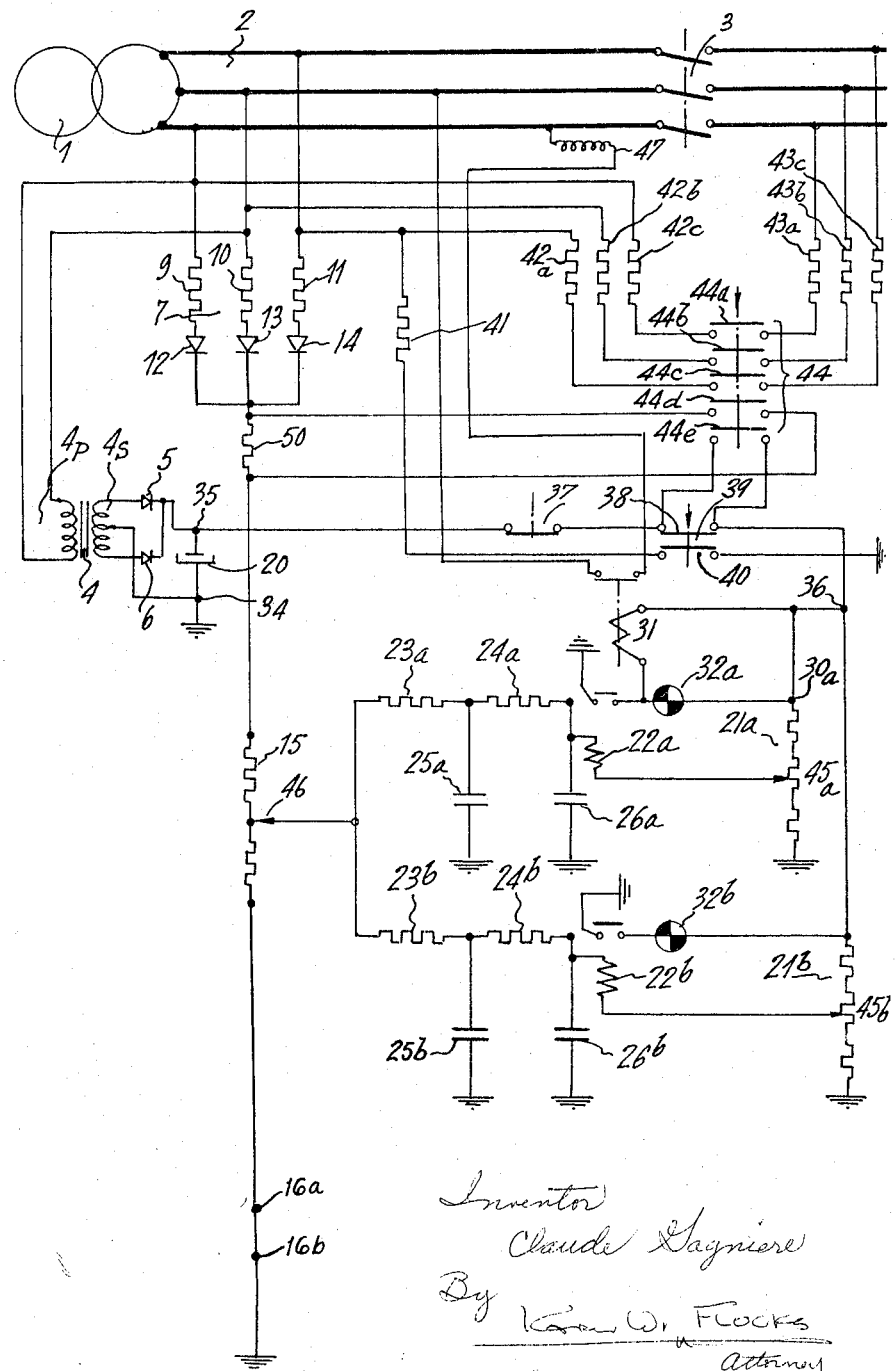

Other features, advantages and characteristics of the present invention will become clear from the following description with reference to the accompanying drawings, wherein:

FIGURE 1 is the circuit diagram of a device adapted to control the ground insulation of an elecrtic network in accordance with the invention; and FIGURES 2, 3 and 4 show circuit modifications for the device of FIGURE 1.

Reference will now be made to the circuit diagram shown in FIGURE 1, in which the numeral 1 identifies the power transformer which supplies the insulated neutral three-phase network 2 which is to be monitored, and 3 designates the overall cutoff apparatus enabling the network conductors to be placed in or out of service.

The insulation control device proper consists of an electric connection between the phases of network 2 and ground. This connection comprises a three-branch star 7 which connects the three phases of network 2 to a common point 8; each of the three branches of the star 7 includes a resistor 9, 10 or 11, each mounted in series with a semiconductor member 12, 13 or 14.

A transformer 4, the primary winding 4p of which is connected between two phases of the network 2, supplies to its secondary winding 4s a voltage proportional to the voltage of the network which is rectified by means of two diodes 5 and 6 and filtered by means of the condenser 20, the negative terminal of which is connected to earth.

On the other hand, the common point 8 of the star 7 is connected to earth through the intermediary of a coupling 8b comprising a resistance 50, a potentiometer 15, and the terminals 16a and 16b being capable of being short-circuited as shown, for example by a strap 17.

Between the terminals 16a and 16b, when the strap 17 is removed, there can be inserted a read-off instrument, for example of the type of apparatus with two crossed needles or a logometer, one of the coils 18a of which is connected in series with the terminals 16a and 16b and the other coil 18b is connected in series between earth and the electric connection 19 joined to the positive terminal 35 of the condenser 20.

The rectified and filtered voltage supplied by the transformer 4 is applied to two potentiometers 21a, 21b connected in parallel. The negative terminal 34 of the filtering capacitor 20 is grounded. The two connections between the slider 46 of potentiometer 15 and the sliders 45a and 45b of potentiometers 21a and 21b each comprise: a filter consisting of two resistors 23a, 23b and 24a, 24b and two capacitors 25a, 25b and 26a, 26b, and an SCR 22a, 22b whose control electrode 27a, 27b is connected to the junction of the resistor 24a, 24b with the capacitor 26a, 26b, and whose output electrode 28a, 28b is connected to the slider of the potentiometer 21a, 21b. The input electrode 29a of the SCR 22a is connected to the end 30a of potentiometer 21a through two parallel circuits including one a relay 31 and the other a signal lamp 32a. The input electrode 29b of SCR 22b is connected to the end terminal 30b of potentiometer 21b through a circuit including a lamp 32b.

In the connection between the terminal 35 of capacitor 20 and the junction 36 of potentiometers 21a and 21b are inserted the reset opening contact 37 and the opening contact 38 of a test switch 39. A connection between one of the phases of network 2 and ground includes, in series, the closing contact 40 of the test switch 39 and a resistor 41.

In the absence of a fault, the slider 46 of potentiometer 15 is at ground potential, whereas sliders 45a and 45b of potentiometers 21a and 21b are respectively at positive potentials U$a$ and U$b$ (U$b$<U$a$) with respect to ground, determined by the position of these sliders and the voltage of the D.C. source fed from the transformer 4.

Since the output electrode 28a, 28b is at a positive potential with respect to the control electrode 27a, 27b, both SCR's 22a and 22b are blocked and no current flows to relay 31 nor to the signal lamps 32a, 32b.

When an insulation fault appears in the network, a polarised current $i_1$ is generated in the connection 8b, and the slider 46 of the potentiometer 15 has a potential U$d$ with respect to the ground..

If the insulation fault is of a resistance sufficienctly high for U$d$ to be less than U$a$ and U$b$, the SCR's 22a and 22b remain blocked, but if the fault becomes less resistive and U$d$ becomes very slightly higher than U$b$, the SCR 22b conducts and a current flows through the signalling lamp 32b which lights up. If the insulation fault further decreases in resistance when U$d$ becomes slightly higher than U$a$, SCR 22a conducts in its turn and a current flows to relay 31, which energizes, and to the lamp 32a, which lights up. Upon being energized, the relay 31 de-energizes the coil 47 of the under-load circuit-breaker 3 and the latter disengages.

The silicon controlled rectifiers 22a and 22b become conducting when U$d$=U$a$ and U$d$=U$b$, and since, all other factors remaining the same, U$a$, U$b$, and U$d$ are proportional to the voltage of the network 2, these relations U$d$=U$a$ and U$d$=U$b$ are valid for any voltage of the network 2.

Then, by using reference potentials U$a$ and U$b$, which are adjustable by the potentiometers 21a and 21b, it is possible to establish triggering and warning thresholds, and said thresholds are independent of any voltage variations in the network.

If it is desired to trigger and signal for different values of faults, it is sufficient to act either on potentiometers 21a and 21b, in which case there is independent control for triggering and warning, or on the potentiometer 15, in which case the triggering and warning thresholds will be varied simultaneously.

When the SCR's 22a and 22b conduct, their supply has to be cut by manually acting on the reset button 37 in order to cause them to revert to the cut-off state when, the fault having been removed, the control electrodes 27a and 27b become negative respectively relative to electrodes 28a and 28b.

At the terminals of each of three contacts of the general circuit-breaker 3 is connected a branch circuit comprising in series two resistances 42a, 43c; 42b, 43b; 42c, 43a and the closure contact 44a, 44b, 44c of a switch 44 with five contacts 44a through 44e.

The prior check of the insulation of the network before the closure of the general circuit-breaker 3 is effected by pressing on the switch 44, the three closure contacts 44a, 44b, 44c all of which close the shunting circuits of the contacts of the circuit-breaker 3. When this is effected, the voltage applied to the part of the network located downstream of 3 is reduced by means of the voltage-dropping resistances 42a, 43c; 42b, 43b; 42c, 43a. The putting into circuit of these resistances reduces the sensitivity of the measuring instrument 18 interposed between the terminals 16a and 16b, in consequence of the reduction of the value of the current passing through the fault, if such exists, and the coupling between point 8 and earth.

It is for this reason that, in order to compensate for this reduction of current, the closure contact 44d shunts the resistance 50 connected in series in the coupling between point 8 and earth.

When the general circuit-breaker 3 is closed, in order to check the accuracy of the measuring instrument 18 connected between the terminals 16a and 16b, the test button 39 is depressed, which has the effect of creating an artificial resistance fault equal to that of the resistance 41.

At the same time, however, the opening contact 38 of this button interrupts the supply to the SCR's and tripping does not take place.

If it is then desired to check the correct operation of the tripping and alram apparatus, it is only necessary at the same time to press down the switch 44, the closure contact 44e of which re-closes the connection interruped by 38. Tripping can then take place.

FIGURE 2 illustrates a variant of the circuit described above, wherein the reference circuits are comprised by two connections between the slider 46 of potentiometer 15 and a terminal 51 positioned on one phase of the network 2. As in the circuitry of FIGURE 1, each connection includes a filter 52a, 52b, a silicon controlled rectifier 22a, 22b, and a potentiometer 21a, 21b. The connection comprising the triggering circuit comprises a relay 31 and a signal lamp 32a, whereas the connection comprising the signalling circuit comprises a lamp 32b, the lamps 32a, 32b being replaceable by a sonic alarm. The principle of operation is the same as in the circuit of FIGURE 1, but the SCR's 22a, 22b are of the "inversed" type, that is to say that in the absence of a fault the control electrode 27a, 27b is at the potential of slider 46, which is in turn at the potential of point 55, since no current flows through the potentiometer 15, whereas the input electrode 29a, 29b, is, on the contrary, at a negative potential with respect to point 55, since a permanent current flows through the potentiometers 21a and 21b.

If a fault appears between one or more phases of network 2 and ground, a current is generated in the potentiometer 15 and the control electrode 27a, 27b connected to point 46 can assume, with respect to point 55, a more negative potential than the input electrode 29a, 29b, and SCR 22a, 22b conducts, causing the relay 31 to be energized and lamp 32a to light up in the case of SCR 22a, and lamp 32b to light up in the case of SCR 22b. As was the case in FIGURE 1, the triggering and warning thresholds are independently adjustable through potentiometers 21a and 21b and simultaneously adjustable through potentiometer 15.

FIGURES 3 and 4 illustrate variants in which the SCR's have been replaced by polarised relays. In the circuitry of FIGURE 3, if the potential of slider 46 with respect to ground in higher than those of sliders 45a and 45b, i.e. when the fault current passing through potentiometer 15 is either nil or of insufficient value (resistance of the fault being to high), relays 22a and 22b are traversed by a current of direction opposite to that which causes them to be energized, and they therefore remain open. If the fault current increases, there is a value of this fault current at which the slider 45a, 45b has a potential higher than that of 46, and the relay 22a, 22b is energised. In order that the operation of these relays be independent of variations in the network voltage, the relays 22a and 22b must energize at a very low current value, that is to say practically as soon as the current in the relays is reversed.

FIGURE 4 illustrates a variant in which, as in the circuitry of FIGURE 2, the reference circuit is comprised by two connections between the slider 46 of the potentiometer 15 and the terminal 51 on one phase of network 2. But in these connections are mounted polarised relays 22a and 22b which are energised as soon as the current flows in the direction from slider 45a, 45b of potentiometer 21a, 21b towards the slider 46 of potentiometer 15, that is to say when the potential differential between 55 and 46 becomes greater than the differential in potential between 55 and 45a, 45b, which situation occurs when the fault current through potentiometer 15 reaches a certain value.

The foregoing circuit arrangements can also be applied to one-phase networks.

It is to be understood that the invention has been described and illustrated merely by way of explanation and without any intention of limitation, and that numerous changes of detail can be made without exceeding the scope of the invention as defined in the following claims.

I claim:

1. Means for continuously monitoring the values of insulation of an electric network with respect to ground and for providing a trigger or alarm signal when insulation faults appear having predetermined insulation values which are independent of network voltage variations and are insensitive to the capacitance of the network, said means comprising:
   polarized common electric connetion means between the phases of the network being monitored and ground;
   resistane means inserted in said connection means and adapted to furnish a first continuous voltage which is a linear function of the current intensity flowing in said connection means;
   D.C. circuit means adapted to furnish a second continuous voltage which is a function of the monitored network voltage and is of the same polarity as said first continuous voltage which is a function of the current intensity flowing in said connection means;
   variable means adapted to compare said first and second voltages;
   means for actuating safety means, when said first continuous voltage is greater in absolute value than said second continuous voltage;
   said means for actuating said safety means being inserted between a point in said resistance means and a point in said D.C. circuit means.

2. Monitoring means according to claim 1, wherein said D.C. circuit means is fed by said network being monitored, through transformer and rectifier means.

3. Monitoring means according to claim 1, wherein said means for actuating said safety means comprises a galvanometric relay.

4. Monitoring means according to claim 1, wherein said means for actuating said safety means comprises a polarized relay.

5. Monitoring means according to claim 1, wherein said means for actuating said safety means comprises a silicon controlled rectifier of which the control electrode and one of its other electrodes are respectively connected to the point furnishing the continuous voltage which is a linear function of the intensity of the polarised current and to the point furnishing the continuous voltage which is a linear function of the network voltage.

6. Monitoring means according to claim 1, wherein said D.C. circuit means fed by said network comprises a plurality of branches, and further comprising a plurality of safety means, said safety means each being inserted in a connection between a point in said resistance means and a point in one of said branches of said D.C. circuit means.

References Cited by the Examiner

UNITED STATES PATENTS

| 3,072,895 | 1/1963 | Kaufman | 340—248 |
| 3,098,999 | 7/1963 | Clapper | 340—248 |
| 3,155,879 | 11/1964 | Casey et al. | 317—32 |

FOREIGN PATENTS

| 1,339,934 | 9/1963 | France. |
| 845,308 | 8/1960 | Great Britain. |
| 141,922 | 3/1961 | Russia. |

MILTON O. HIRSHFIELD, *Pirmary Examiner.*

SAMUEL BERNSTEIN, *Examiner.*

R. V. LUPO, *Assistant Examiner.*